US006183844B1

(12) United States Patent
Li

(10) Patent No.: US 6,183,844 B1
(45) Date of Patent: Feb. 6, 2001

(54) INKJET PRINTING MEDIUM COMPRISING MULTIPLE COATINGS

(75) Inventor: Huawen Li, Delmont, PA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/213,085

(22) Filed: Dec. 16, 1998

(51) Int. Cl.[7] .......... B32B 7/02

(52) U.S. Cl. .......... 428/212; 428/195; 428/207; 428/211; 428/323; 428/328; 428/329; 428/331; 428/500; 428/522; 428/532

(58) Field of Search .......... 428/195, 211, 428/212, 323, 328, 329, 331, 207, 500, 522, 532

(56) References Cited

U.S. PATENT DOCUMENTS

| | | | | |
|---|---|---|---|---|
| 4,857,386 | | 8/1989 | Butters et al. | 428/206 |
| 5,190,805 | | 3/1993 | Atherton et al. | 428/195 |
| 5,206,071 | | 4/1993 | Atherton et al. | 428/195 |
| 5,277,965 | | 1/1994 | Malhotra | 428/216 |
| 5,474,843 | | 12/1995 | Lambert et al. | 428/327 |
| 5,672,424 | | 9/1997 | Malhotra et al. | 428/325 |
| 5,683,793 | | 11/1997 | Malhotra et al. | 428/216 |
| 5,693,410 | | 12/1997 | Malhotra et al. | 428/216 |
| 5,709,976 | | 1/1998 | Malhotra | 430/124 |
| 5,714,245 | | 2/1998 | Atherton et al. | 428/323 |
| 5,733,672 | | 3/1998 | Lambert | 428/704 |
| 5,747,148 | | 5/1998 | Wagner et al. | 428/212 |
| 5,789,070 | | 8/1998 | Shaw-Klein et al. | 428/216 |
| 5,856,023 | | 1/1999 | Chen et al. | 428/520 |
| 5,919,559 | * | 7/1999 | Nakano et al. | 428/331 |
| 6,015,624 | * | 1/2000 | Williams | 428/500 |

FOREIGN PATENT DOCUMENTS

| | | | | |
|---|---|---|---|---|
| 696516 | * | 2/1996 | (EP) | B41M/5/00 |
| 0 806 299 A1 | | 11/1997 | (EP) . | |
| 0 818 322 A1 | | 1/1998 | (EP) . | |
| 96/18496 | | 6/1996 | (WO) . | |

* cited by examiner

*Primary Examiner*—Bruce H. Hess
*Assistant Examiner*—Michael E. Grendzynski

(57) ABSTRACT

A printing medium suitable for inkjet printing comprises a substrate having at least two water-absorptive coatings applied sequentially. Each of the two water-absorptive coatings comprises hydrophilic organic polymer and small discrete nonfilm-forming particles. The hydrophilic organic polymer of the interior water-absorptive coating adjacent the exterior water-absorptive coating contains a greater quantity of nitrogen-containing substance than the hydrophilic organic polymer of the exterior water-absorptive coating. "Nitrogen-containing substance" is defined as being independently selected from the group consisting of quaternary ammonium mer units, poly(N-vinylpyrrolidinone), copolymer of N-vinylpyrrolidinone and α-(meth)acrylyloxy-ω-(hydroxy, methoxy, or ethoxy)-poly(ethylene oxide), and two or more thereof.

18 Claims, No Drawings

INKJET PRINTING MEDIUM COMPRISING MULTIPLE COATINGS

When substrates coated with an ink-receiving coating are printed with inkjet printing inks and dried, the inks often later migrate from their original locations on the coated substrate, thereby resulting in unsatisfactory images. Such migration is known as "bleed" or "bloom" and is especially prevalent under conditions of high temperature and high humidity such as for example, 35° C. and 80 percent relative humidity.

Low wet smear resistance is another problem that has arisen in inkjet printing. "Wet smear resistance" is the ability of inkjet printing to resist smearing when the inkjet printed and dried substrate is rubbed in the presence of water.

Printing media which may be inkjet printed to provide images of low bleed and/or improved wet smear resistance when used with a wide variety of inkjet printing inks, and printed media which provide images of low bleed and/or improved wet smear resistance, have now been found.

Accordingly a first embodiment of the invention is a printing medium comprising: (a) a substrate having at least one surface; (b) an interior water-absorptive coating on a surface of the substrate wherein the interior water-absorptive coating comprises: (1) a matrix of hydrophilic organic polymer which contains from 10 to 50 percent by weight nitrogen-containing substance, and (2) discrete nonfilm-forming particles which have a number average particle size in the range of from 1 to 500 nanometers and which are distributed throughout the matrix of the interior water-absorptive coating; and (c) an exterior water-absorptive coating on the interior water-absorptive coating wherein the exterior water-absorptive coating comprises: (1) a matrix of hydrophilic organic polymer which contains from 0 to 30 percent by weight nitrogen-containing substance, and (2) discrete nonfilm-forming particles which have a number average particle size in the range of from 1 to 500 nanometers and which are distributed throughout the matrix of the exterior water-absorptive coating; wherein: (d) each nitrogen-containing substance is independently selected from the group consisting of quaternary ammonium mer units, poly(N-vinylpyrrolidinone), copolymer of N-vinylpyrrolidinone and α-(meth)acrylyloxy-ω-(hydroxy, methoxy, or ethoxy)-poly(ethylene oxide), and two or more thereof; and (e) the hydrophilic organic polymer of the interior water-absorptive coating contains a greater quantity of nitrogen-containing substance than the hydrophilic organic polymer of the exterior water-absorptive coating, on a percent by weight basis.

The interior water-absorptive coating and the exterior water-absorptive coating both comprise hydrophilic organic polymer. The main difference is that the hydrophilic organic polymer of the interior water-absorptive coating contains more nitrogen-containing substance than the hydrophilic organic polymer of the exterior water-absorptive coating. Usually, but not necessarily, the difference between the quantity of nitrogen-containing substance of the hydrophilic organic polymer of the interior coating expressed as percent by weight and the quantity of nitrogen-containing substance of the hydrophilic organic polymer of the exterior coating expressed as percent by weight, is at least 0.1 percent. Often the difference is at least 1 percent. In many cases the difference is at least 5 percent. Preferably the difference is at least 10 percent. These differences are formed by simple subtraction of the two percentages.

In the interests of brevity, the coating composition used to form the interior water-absorptive coating will be referred to as the "interior coating composition" and the coating composition used to form the exterior water-absorptive coating will be referred to as the "exterior coating composition".

The printing media of the invention may be made by coating a surface of a substrate with an interior coating composition to form an interior coating, and coating the interior coating with an exterior coating composition to form an exterior coating. Volatile aqueous liquid may be partially or wholly removed from the interior coating prior to coating with the exterior coating composition. Alternatively, the exterior coating composition may be applied to the interior coating before removing volatile aqueous liquid; volatile aqueous liquid is then substantially removed after application of the exterior coating composition.

The substrate may be any substrate at least one surface of which is capable of bearing the coating discussed above. In most instances the substrate is in the form of an individual sheet or in the form of a roll, web, strip, film, or foil of material capable of being cut into sheets. It may be an uncoated material or it may be the exposed coating of a material which has been previously coated with one or more coatings.

The substrate may be porous throughout, it may be nonporous throughout, or it may comprise both porous regions and nonporous regions.

Examples of porous substrates include paper, paperboard, wood, cloth, nonwoven fabric, felt, unglazed ceramic material, polymer membranes, porous foam, and microporous foam.

Examples of substrates which are substantially nonporous throughout include sheets or films of organic polymer such as poly(ethylene terephthalate), polyethylene, polypropylene, cellulose acetate, poly(vinyl chloride), and copolymers such as saran. The sheets or films may be metallized or unmetallized as desired. Additional examples include metal substrates including but not limited to metal foils such as aluminum foil and copper foil. Yet another example is a porous or microporous foam comprising thermoplastic organic polymer which foam has been compressed to such an extent that the resulting deformed material is substantially nonporous. Still another example is glass.

Base stocks which are normally porous such as for example paper, paperboard, wood, cloth, nonwoven fabric, felt, unglazed ceramic material, polymer membranes, porous foam, or microporous foam may be coated or laminated to render one or more surfaces substantially nonporous and thereby provide substrates having at least one substantially nonporous surface.

The substrate may be substantially transparent, it may be substantially opaque, or it may be of intermediate transparency. For some applications such as inkjet printed overhead slides, the substrate must be sufficiently transparent to be useful for that application. For other applications such as inkjet printed paper, transparency of the substrate is not so important.

Each of the coating compositions used to produce the printing media of the invention can independently be in the form of an aqueous solution in which case the volatile aqueous liquid is a volatile aqueous solvent for the film-forming organic polymer of the coating composition, or the coating composition can be in the form of an aqueous dispersion in which instance the volatile aqueous liquid is a volatile aqueous dispersion liquid for at least some of the film-forming organic polymer of the coating composition.

The volatile aqueous liquid is predominately water. Small amounts of low boiling volatile water-miscible organic liquids may be intentionally added for particular purposes. Examples of such low boiling volatile water-miscible organic liquids solvents include methanol [CAS 67-56-1], ethanol [CAS 64-17-5], 1-propanol, [CAS 71-23-8], 2-propanol [CAS 67-63-0], 2-butanol [CAS 78-92-2], 2-methyl-2-propanol [CAS 75-65-0], 2-propanone [CAS 67-64-1], and 2-butanone [CAS 78-93-3]. The listing of such liquids is by no means exhaustive.

Similarly, water-miscible organic liquids which themselves are of low, moderate, or even negligible volatility may be intentionally added for particular purposes, such as for example, retardation of evaporation. Examples of such organic liquids include 2-methyl-1-propanol [CAS 78-83-1], 1-butanol [CAS 71-36-3], 1,2-ethanediol [CAS 107-21-1], and 1,2,3-propanetriol [CAS 56-81-5]. The listing of such liquids is by no means exhaustive.

Those materials which, although not intentionally added for any particular purpose, are normally present as impurities in one or more of the components of the coating compositions of the invention and which become components of the volatile aqueous liquid, may be present at low concentrations.

In most instances water constitutes at least 60 percent by weight of the volatile aqueous liquid. Often water constitutes at least 80 percent by weight of the volatile aqueous liquid. Preferably water constitutes substantially all of the volatile aqueous liquid.

The amount of volatile aqueous liquid present in the coating composition may vary widely. The minimum amount is that which will produce a coating composition having a viscosity low enough to apply as a coating. The maximum amount is not governed by any theory, but by practical considerations such as the cost of the volatile aqueous liquid, the minimum desired thickness of the coating to be deposited, and the cost and time required to remove volatile aqueous liquid from the applied wet coating. Usually, however, the volatile aqueous liquid constitutes from 30 to 98 percent by weight of the coating composition. In many cases the volatile aqueous liquid constitutes from 50 to 96 percent by weight of the coating composition. Often the volatile aqueous liquid constitutes from 60 to 95 percent by weight of the coating composition. Preferably the volatile aqueous liquid constitutes from 75 to 95 percent by weight of the composition.

In general, the film-forming hydrophilic organic polymers present in the coating compositions are water-soluble or water-dispersible. The film-forming hydrophilic organic polymer may be a single polymer, but it is more often a mixture of two or more polymers.

The water-soluble film-forming hydrophilic organic polymers which may be used in the present invention are numerous and widely varied. Examples include poly (ethylene oxide), poly(vinyl alcohol), water-soluble cellulosic organic polymer, or a mixture of two or more thereof.

Water-soluble poly(ethylene oxide) is known. Such materials are ordinarily formed by polymerizing ethylene oxide [CAS 75-21-8], usually in the presence of a small amount of an initiator such as low molecular weight glycol or triol. Examples of such initiators include ethylene glycol [CAS 107-21-1], diethylene glycol [CAS 111-46-6], triethylene glycol [CAS 112-27-6], tetraethylene glycol [CAS 112-60-7], propylene glycol [CAS 57-55-6], trimethylene glycol [CAS 504-63-2], dipropylene glycol [CAS 110-98-5], glycerol [CAS 56-81-5], trimethylolpropane [CAS 77-99-6], and α,ω-diaminopoly(propylene glycol) [CAS 9046-10-0]. One or more other lower alkylene oxides such as propylene oxide [CAS 75-56-9] and trimethylene oxide [CAS 503-30-0] may also be employed as comonomer with the ethylene oxide, whether to form random polymers or block polymers, but they should be used only in those small amounts as will not render the resulting polymer both water-insoluble and nondispersible in water. As used herein and in the claims, the term "poly(ethylene oxide)" is intended to include the foregoing copolymers of ethylene oxide with small amounts of lower alkylene oxide, as well as homopolymers of ethylene oxide. The configuration of the poly(ethylene oxide) can be linear, branched, comb, or star-shaped. The preferred terminal groups of the poly(ethylene oxide) are hydroxyl groups, but terminal lower alkoxy groups such as methoxy groups may be present provided their types and numbers do not render the poly(ethylene oxide) polymer unsuitable for its purpose. In most cases the poly(ethylene oxide) is water-soluble. The preferred poly(ethylene oxide) is a water-soluble homopolymer of ethylene oxide produced using a small amount of ethylene glycol as an initiator.

The weight average molecular weight of the water-soluble poly(ethylene oxide) may vary widely. Usually it is in the range of from 100,000 to 3,000,000 although a weight average molecular weights somewhat below 100,000 or somewhat above 3,000,000 may be used. Often the weight average molecular weight of the water-soluble poly(ethylene oxide) is in the range of from 150,000 to 1,000,000. Frequently the weight average molecular weight of the water-soluble poly(ethylene oxide) is in the range of from 200,000 to 1,000,000. From 300,000 to 700,000 is preferred.

Water-soluble poly(vinyl alcohol) may be broadly classified as one of two types. The first type is fully hydrolyzed water-soluble poly(vinyl alcohol) in which less than 1.5 mole percent acetate groups are left on the molecule. The second type is partially hydrolyzed water-soluble poly(vinyl alcohol) in which from 1.5 to as much as 20 mole percent acetate groups are left on the molecule. The water-soluble organic polymer may comprise either type or a mixture of both. The weight average molecular weight of the water-soluble poly(vinyl alcohol) may vary considerably, but often it is in the range of from 5,000 to 400,000. In many cases the weight average molecular weight is in the range of from 10,000 to 300,000. From 50,000 to 200,000 is preferred.

There are many widely varying types of water-soluble cellulosic organic polymers which may be employed in the present invention. Of these, the water-soluble cellulose ethers are preferred water-soluble cellulosic organic polymers. Many of the water-soluble cellulose ethers are also excellent water retention agents. Examples of the water-soluble cellulose ethers include water-soluble methylcellulose [CAS 9004-67-5], water-soluble carboxymethylcellulose, water-soluble sodium carboxymethylcellulose [CAS 9004-32-4], water-soluble ethylmethylcellulose, water-soluble hydroxyethylmethylcellulose [CAS 9032-42-2], water-soluble hydroxypropylmethylcellulose [CAS 9004-65-3], water-soluble hydroxyethylcellulose [CAS 9004-62-0], water-soluble ethylhydroxyethylcellulose, water-soluble sodium carboxymethylhydroxyethylcellulose, water-soluble hydroxypropylcellulose [CAS 9004-64-2], water-soluble hydroxybutylcellulose [CAS 37208-08-5], water-soluble hydroxybutylmethylcellulose [CAS 9041-56-9] and water-soluble cellulose sulfate sodium salt [CAS 9005-22-5]. Water-soluble hydroxypropylcellulose is preferred.

Water-soluble hydroxypropylcellulose is a known material and is available commercially in several different weight average molecular weights. The weight average molecular weight of the water-soluble hydroxypropylcellulose used in the present invention can vary widely, but usually it is in the range of from 100,000 to 1,000,000. Often the weight average molecular weight is in the range of from 100,000 to 500,000. From 200,000 to 400,000 is preferred. Two or more water-soluble hydroxypropylcelluloses having different weight average molecular weights may be admixed to obtain a water-soluble hydroxypropyl cellulose having a differing weight average molecular weight.

Similarly, there are many widely varying kinds of other water-soluble polymers which may be employed in the present invention. Examples include water-soluble poly (vinylpyridine), water-soluble poly(ethylenimine), water-soluble ethoxylated poly(ethylenimine), water-soluble poly (ethylenimine)-epichlorohydrin, water-soluble polyacrylate, water-soluble sodium polyacrylate, water-soluble poly (acrylamide), water-soluble carboxy modified poly(vinyl alcohol), water-soluble poly(2-acrylamido-2-methylpropane sulfonic acid), water-soluble poly(styrene sulfonate), water-soluble vinyl methyl ether/maleic acid copolymer, water-soluble styrene-maleic anhydride copolymer, water-soluble ethylene-maleic anhydride copolymer, water-soluble acrylamide/acrylic acid copolymer, water-soluble poly (diethylene triamine-co-adipic acid), water-soluble poly [(dimethylamino)ethyl methacrylate hydrochloride], water-soluble quaternized poly(imidazoline), water-soluble poly (N,N-dimethyl-3,5-dimethylene piperidinium chloride), water-soluble poly(vinylpyridinium halide), water-soluble starch, water-soluble oxidized starch, water-soluble casein, water-soluble gelatin, water-soluble sodium alginate, water-soluble carrageenan, water-soluble dextran, water-soluble gum arabic, water-soluble pectin, water-soluble albumin, and water-soluble agar-agar.

Still other kinds of other water-soluble polymers which may be employed in the present invention include the water-soluble cationic polyacrylates. Water-soluble cationic polyacrylates are themselves well known. Usually, but not necessarily, they are copolymers of one or more (meth) acrylic esters and enough amino-functional ester of (meth) acrylic acid to provide sufficient onium cations to render the acrylic polymer water-soluble. The onium may be primary ammonium, secondary ammonium, tertiary ammonium, quaternary ammonium, phosphonium, or sulfonium. Secondary ammonium, tertiary ammonium, or quaternary ammonium is preferred. Quaternary ammonium is especially preferred. Usually the water-soluble cationic polyacrylate is a primary, secondary, tertiary, or quaternary ammonium salt, or it is a quaternary ammonium hydroxide.

Water-dispersible film-forming polymers such as water-dispersible poly(ethylene-co-acrylic acid)or water-dispersible cationic acrylic polymer may be used.

The film-forming hydrophilic organic polymer of the interior coating composition, and hence the interior water-absorptive coating of the printing medium, contains from 10 to 50 percent by weight nitrogen-containing substance. Frequently the film-forming hydrophilic organic polymer of the interior coating composition, and hence the interior water-absorptive coating of the printing medium, contains from 12 to 40 percent by weight nitrogen-containing substance. Preferably the film-forming hydrophilic organic polymer of the interior coating composition, and hence the interior water-absorptive coating of the printing medium, contains from 15 to 30 percent by weight nitrogen-containing substance.

The film-forming hydrophilic organic polymer of the exterior coating composition, and hence the exterior water-absorptive coating of the printing medium, contains from 0 to 30 percent by weight nitrogen-containing substance. In many cases the film-forming hydrophilic organic polymer of the exterior coating composition, and hence the exterior water-absorptive coating of the printing medium, contains from 0 to 20 percent by weight nitrogen-containing substance. Frequently the film-forming hydrophilic organic polymer of the exterior coating composition, and hence the exterior water-absorptive coating of the printing medium, contains from 0 to 10 percent by weight nitrogen-containing substance. Often the film-forming hydrophilic organic polymer of the exterior coating composition, and hence the exterior water-absorptive coating of the printing medium, contains from 0.1 to 30 percent by weight nitrogen-containing substance. In some instances the film-forming hydrophilic organic polymer of the exterior coating composition, and hence the exterior water-absorptive coating of the printing medium, contains from 0.5 to 20 percent by weight nitrogen-containing substance. In other cases the film-forming hydrophilic organic polymer of the exterior coating composition, and hence the exterior water-absorptive coating of the printing medium, contains from 1 to 10 percent by weight nitrogen-containing substance.

As used herein, "nitrogen-containing substance" is selected from the group consisting of quaternary ammonium mer units, poly(N-vinylpyrrolidinone), copolymer of N-vinylpyrrolidinone and α-(meth)acrylyloxy-ω-(hydroxy, ethoxy, or ethoxy)-poly(ethylene oxide), and two or more hereof.

Water-soluble and water-dispersible polymers containing quaternary ammonium mer units and their preparation are well known. These polymers comprise quaternary ammonium-containing mer units and quaternary ammonium-free mer units.

The quaternary ammonium-containing mer units are monomeric units derived from ethylenically unsaturated monomers containing either quaternary ammonium groups or tertiary amino groups which can be and are quaternized by conventional methods after polymerization to form the polymer. The counter ion can be any of those commonly employed such as for example chloride, bromide, nitrate, hydrogen sulfate, methylsulfate, sulfonate, acetate, and the like, and are hereinafter and in the claims generically referred to as "salt". Usually, but not necessarily, these monomers contain acrylyl functionality, methacrylyl functionality, or vinyl functionality, although others such as allyl functionality or methallyl functionality may be used.

Examples of ethylenically unsaturated monomers containing quaternary ammonium groups include:

trimethyl-2-(methacryloyloxy)ethylammonium salt,
triethyl-2-(methacryloyloxy)ethylammonium salt,
trimethyl-2-(acryloyloxy)ethylammonium salt,
triethyl-2-(acryloyloxy)ethylammonium salt,
trimethyl-3-(methacryloyloxy)propylammonium salt,
triethyl-3-(methacryloyloxy)propylammonium salt,
trimethyl-2-(methacryloylamino)ethylammonium salt,
triethyl-2-(methacryloylamino)ethylammonium salt,
trimethyl-2-(acryloylamino)ethylammonium salt,
triethyl-2-(acryloylamino)ethylammonium salt,
trimethyl-3-(methacryloylamino)propylammonium salt,
triethyl-3-(methacryloylamino)propylammonium salt,
trimethyl-3-(acryloylamino)propylammonium salt,
triethyl-3-(acryloylamino)propylammonium salt,
N,N-dimethyl-N-ethyl-2-(methacryloyloxy) ethylammonium salt,
N,N-diethyl-N-methyl-2-(methacryloyloxy) ethylammonium salt, N,N-dimethyl-N-ethyl-3-(acryloylamino) propylammonium salt,
N,N,N-trimethyl-N-(p-vinylbenzyl)ammonium salt,
N,N,N-trimethyl-N-(m-vinylbenzyl)ammonium salt,
N,N,N-triethyl-N-(p-vinylbenzyl)ammonium salt,
N,N,N-triethyl-N-(m-vinylbenzyl)ammonium salt,
N,N-dimethyl-N-ethyl-N-(p-vinylbenzyl)ammonium salt, and
N,N-diethyl-N-methyl-N-(p-vinylbenzyl)ammonium salt.

Examples of ethylenically unsaturated monomer which contains at least one tertiary amino group that can be converted to a quaternary ammonium group after polymerization include:

dimethylaminoethyl methacrylate,
diethylaminoethyl methacrylate,
dimethylaminoethyl acrylate,
diethylaminoethyl acrylate,
dimethylaminopropyl methacrylate,
diethylaminopropyl methacrylate,
N-(dimethylaminoethyl) methacrylamide
N-(diethylaminoethyl) methacrylamide
N-(dimethylaminoethyl) acrylamide
N-(diethylaminoethyl) acrylamide
N-(dimethylaminopropyl) methacrylamide
N-(diethylaminopropyl) methacrylamide
N-(dimethylaminopropyl) acrylamide
N-(diethylaminopropyl) acrylamide
N-ethyl-N-methylaminoethyl methacrylate,
N-ethyl-N-methylaminopropyl acrylate,
N,N-dimethyl-N-(p-vinylbenzyl)amine,
N,N-dimethyl-N-(m-vinylbenzyl)amine,
N,N-diethyl-N-(p-vinylbenzyl)amine,
N,N-diethyl-N-(m-vinylbenzyl)amine, and
N-ethyl-N-methyl-N-(p-vinylbenzyl)amine.

The quaternary ammonium-free mer units are monomeric units derived from ethylenically unsaturated monomers which do not contain either quaternary ammonium groups or tertiary amino groups which are quaternized by conventional methods after polymerization to form the polymer. These comprise tertiary amino groups which are not quaternized by conventional methods after polymerization to form the polymer, secondary ammonium-containing mer units, tertiary ammonium-containing mer units and ammonium-free mer units.

The secondary ammonium-containing mer units are derived from ethylenically unsaturated monomers containing either secondary ammonium groups or secondary amino groups which can be converted to secondary ammonium groups by conventional methods after polymerization to form the polymer. The counter ion can be any of those commonly employed such as for example chloride, bromide, nitrate, hydrogen sulfate, methylsulfate, sulfonate, acetate, and the like, and are hereinafter and in the claims generically referred to as "salt". Usually, but not necessarily, these monomers contain acrylyl functionality, methacrylyl functionality, or vinyl functionality, although others such as allyl functionality or methallyl functionality may be used.

Examples of ethylenically unsaturated monomers containing secondary ammonium groups include:

methyl-2-(methacryloyloxy)ethylammonium salt,
ethyl-2-(methacryloyloxy)ethylammonium salt,
n-propyl-2-(methacryloyloxy)ethylammonium salt,
isopropyl-2-(methacryloyloxy)ethylammonium salt,
n-butyl-2-(methacryloyloxy)ethylammonium salt,
sec-butyl-2-(methacryloyloxy)ethylammonium salt,
isobutyl-2-(methacryloyloxy)ethylammonium salt,
tert-butyl-2-(methacryloyloxy)ethylammonium salt,
methyl-2-(acryloyloxy)ethylammonium salt,
ethyl-2-(acryloyloxy)ethylammonium salt,
n-propyl-2-(acryloyloxy)ethylammonium salt,
isopropyl-2-(acryloyloxy)ethylammonium salt,
n-butyl-2-(acryloyloxy)ethylammonium salt,
sec-butyl-2-(acryloyloxy)ethylammonium salt,
isobutyl-2-(acryloyloxy)ethylammonium salt,
tert-butyl-2-(acryloyloxy)ethylammonium salt,
methyl-3-(methacryloyloxy)propylammonium salt,
ethyl-3-(methacryloyloxy)propylammonium salt,
n-propyl-3-(methacryloyloxy)propylammonium salt,
methyl-3-(acryloyloxy)propylammonium salt,
ethyl-3-(acryloyloxy)propylammonium salt,
n-propyl-3-(acryloyloxy)propylammonium salt,
methyl-2-(acryloylamino)ethylammonium salt,
ethyl-2-(methacryloylamino)ethylammonium salt,
n-propyl-2-(methacryloylamino)ethylammonium salt,
isopropyl-2-(methacryloylamino)ethylammonium salt,
n-butyl-2-(methacryloylamino)ethylammonium salt,
sec-butyl-2-(methacryloylamino)ethylammonium salt,
isobutyl-2-(methacryloylamino)ethylammonium salt,
tert-butyl-2-(methacryloylamino)ethylammonium salt,
methyl-2-(acryloylamino)ethylammonium salt,
ethyl-2-(acryloylamino)ethylammonium salt,
n-propyl-2-(acryloylamino)ethylammonium salt,
isopropyl-2-(acryloylamino)ethylammonium salt,
n-butyl-2-(acryloylamino)ethylammonium salt,
sec-butyl-2-(acryloylamino)ethylammonium salt,
isobutyl-2-(acryloylamino)ethylammonium salt,
tert-butyl-2-(acryloylamino)ethylammonium salt,
methyl-3-(methacryloylamino)propylammonium salt,
ethyl-3-(methacryloylamino)propylammonium salt,
n-propyl-3-(methacryloylamino)propylammonium salt,
methyl-3-(acryloylamino)propylammonium salt,
ethyl-3-(acryloylamino)propylammonium salt,
n-propyl-3-(acryloylamino)propylammonium salt,
methyl-p-vinylbenzylammonium salt,
methyl-m-vinylbenzylammonium salt,
ethyl-p-vinylbenzylammonium salt, and
ethyl-m-vinylbenzylammonium salt.

Examples of ethylenically unsaturated monomer which contains at least one secondary amino group that can be converted to a secondary ammonium group after polymerization include:

methylaminoethyl methacrylate,
ethylaminoethyl methacrylate,
n-propylaminoethyl methacrylate,
isopropylaminoethyl methacrylate,
n-butylaminoethyl methacrylate,
sec-butylaminoethyl methacrylate,
isobutylaminoethyl methacrylate,
tert-butylaminoethyl methacrylate, methylaminoethyl acrylate,
ethylaminoethyl acrylate,
n-propylaminoethyl acrylate,
isopropylaminoethyl acrylate,
n-butylaminoethyl acrylate,
sec-butylaminoethyl acrylate,
isobutylaminoethyl acrylate,
tert-butylaminoethyl acrylate,
methylaminopropyl methacrylate,
ethylaminopropyl methacrylate,
n-propylaminopropyl methacrylate,
isopropylaminopropyl methacrylate,
n-butylaminopropyl methacrylate,
sec-butylaminopropyl methacrylate,
isobutylaminopropyl methacrylate,
tert-butylaminopropyl methacrylate,
methylaminopropyl acrylate,
ethylaminopropyl acrylate,
n-propylaminpropyl acrylate,
isopropylaminopropyl acrylate,
n-butylaminopropyl acrylate,
sec-butylaminopropyl acrylate,
isobutylaminopropyl acrylate,
tert-butylaminopropyl acrylate,
N-(methylaminoethyl) methacrylamide
N-(ethylaminoethyl) methacrylamide
N-(methylaminoethyl) acrylamide
N-(ethylaminoethyl) acrylamide
N-(methylaminopropyl) methacrylamide
N-(ethylaminopropyl) methacrylamide
N-(methylaminopropyl) acrylamide
N-(ethylaminopropyl) acrylamide
N-methyl-N-(methylaminoethyl) methacrylamide
N-methyl-N-(methylaminoethyl) acrylamide
N-methyl-N-(p-vinylbenzyl)amine,
N-methyl-N-(m-vinylbenzyl)amine,
N-ethyl-N-(p-vinylbenzyl)amine,
N-ethyl-N-(m-vinylbenzyl)amine.

The tertiary ammonium-containing mer units are derived from ethylenically unsaturated monomers containing either tertiary ammonium groups or tertiary amino groups which can be converted to tertiary ammonium groups by conventional methods after polymerization to form the polymer. The counter ion can be any of those commonly employed such as for example chloride, bromide, nitrate, hydrogen sulfate, methylsulfate, sulfonate, acetate, and the like, and are hereinafter and in the claims generically referred to as "salt". Usually, but not necessarily, these monomers contain acrylyl functionality, methacrylyl functionality, or vinyl functionality, although others such as allyl functionality or methallyl functionality may be used.

Examples of ethylenically unsaturated monomers containing tertiary ammonium groups include:

dimethyl-2-(methacryloyloxy)ethylammonium salt,
diethyl-2-(methacryloyloxy)ethylammonium salt,
dimethyl-2-(acryloyloxy)ethylammonium salt,
diethyl-2-(acryloyloxy)ethylammonium salt,
dimethyl-3-(methacryloyloxy)propylammonium salt,
diethyl-3-(methacryloyloxy)propylammonium salt,
dimethyl-2-(methacryloylamino)ethylammonium salt,
diethyl-2-(methacryloylamino)ethylammonium salt,
dimethyl-2-(acryloylamino)ethylammonium salt,
diethyl-2-(acryloylamino)ethylammonium salt,
dimethyl-3-(methacryloylamino)propylammonium salt,
diethyl-3-(methacryloylamino)propylammonium salt,
dimethyl-3-(acryloylamino)propylammonium salt,
diethyl-3-(acryloylamino)propylammonium salt,
N-methyl-N-ethyl-2-(methacryloyloxy)ethylammonium salt,
N-ethyl-N-methyl-2-(methacryloyloxy)ethylammonium salt,
N-methyl-N-ethyl-3-(acryloylamino)propylammonium salt,
dimethyl-p-vinylbenzylammonium salt,
dimethyl-m-vinylbenzylammonium salt,
diethyl-p-vinylbenzylammonium salt,
diethyl-m-vinylbenzylammonium salt,
N-methyl-N-ethyl-p-vinylbenzylammonium salt,
N-methyl-N-ethyl-p-vinylbenzylammonium salt, Examples of ethylenically unsaturated monomer which contains at least one tertiary amino group that can be converted to a tertiary ammonium group after polymerization include:

dimethylaminoethyl methacrylate,
diethylaminoethyl methacrylate,
dimethylaminoethyl acrylate,
diethylaminoethyl acrylate,
dimethylaminopropyl methacrylate,
diethylaminopropyl methacrylate,
N-(dimethylaminoethyl) methacrylamide
N-(diethylaminoethyl) methacrylamide
N-(dimethylaminoethyl) acrylamide
N-(diethylaminoethyl) acrylamide
N-(dimethylaminopropyl) methacrylamide
N-(diethylaminopropyl) methacrylamide
N-(dimethylaminopropyl) acrylamide
N-(diethylaminopropyl) acrylamide
N-ethyl-N-methylaminoethyl methacrylate,
N-ethyl-N-methylaminopropyl acrylate,
N,N-dimethyl-N-(p-vinylbenzyl)amine,
N,N-dimethyl-N-(m-vinylbenzyl)amine,
N,N-diethyl-N-(p-vinylbenzyl)amine,
N,N-diethyl-N-(m-vinylbenzyl)amine, and
N-ethyl-N-methyl-N-(p-vinylbenzyl)amine.

The ammonium-free mer units are derived from ethylenically unsaturated monomers containing groups which are devoid of ammonium groups. Usually, but not necessarily, these monomers contain acrylyl functionality, methacrylyl functionality, or vinyl functionality, although others such as allyl functionality or methallyl functionality may be used. Examples of ethylenically unsaturated monomers which are devoid of ammonium groups include: methyl methacrylate, ethyl methacrylate, n-propyl methacrylate, isopropyl methacrylate, n-butyl methacrylate, sec-butyl methacrylate, isobutyl methacrylate, tert-butyl methacrylate, methyl acrylate, ethyl acrylate, n-propyl acrylate, isopropyl acrylate, n-butyl acrylate, sec-butyl acrylate, isobutyl acrylate, tert-butyl acrylate, N-methyl methacrylamide, N-ethyl methacrylamide, N-n-propyl methacrylamide, N-isopropyl methacrylamide, N-n-butyl methacrylamide, N-sec-butyl methacrylamide, N-isobutyl methacrylamide, N-tert-butyl methacrylamide, N-methyl acrylamide, N-ethyl acrylamide, N-n-propyl acrylamide, N-isopropyl acrylamide, N-n-butyl acrylamide, N-sec-butyl acrylamide, N-isobutyl acrylamide, N-tert-butyl acrylamide, N,N-dimethyl methacrylamide, N,N-dimethyl methacrylamide, styrene, α-methylstyrene, phenyl methacrylate, phenyl acrylate, o-tolyl methacrylate, m-tolyl methacrylate, p-tolyl methacrylate, o-tolyl acrylate, m-tolyl acrylate, p-tolyl acrylate, benzyl methacrylate, and benzyl acrylate. Of these, alkyl acrylate wherein the alkyl group contains from 1 to 4 carbon atoms, alkyl methacrylate wherein the alkyl group contains from 1 to 4 carbon atoms, and styrene are preferred.

Another nitrogen-containing substance which may be used is poly(N-vinylpyrrolidinone) which itself is a known material. Usually, but not necessarily, the weight average molecular weight of the poly(N-vinylpyrrolidinone) is in the range of from 1,000 to 3,000,000. Often the weight average molecular weight is in the range of from 5,000 to 1,000,000. From 5,000 to 500,000 is preferred.

Yet another nitrogen-containing substance which may be used is copolymer of N-vinylpyrrolidinone and α-(meth) acrylyloxy-ω-(hydroxy, methoxy, or ethoxy)-poly(ethylene oxide).

The copolymer of N-vinylpyrrolidinone and α-(meth) acrylyloxy-ω-(hydroxy, methoxy, or ethoxy)-poly(ethylene oxide) is an addition copolymer of ethylenically unsaturated monomers, wherein the ethylenically unsaturated monomers comprise: (a) N-vinyl-2-pyrrolidinone; and (b) ethylenically unsaturated polyether represented by the formula:

Formula (1)

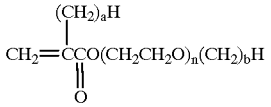

wherein: (1) the average value of a is in the range of from 0 to 1; (2) the average value of b is in the range of from 0 to 2; and (3) the average value of n is in the range of from I to 30.

The copolymer itself is usually either water-soluble or water-dispersible, but preferably the copolymer is water-dispersible at ordinary room temperatures.

The average value of a may be a whole or fractional number in the range of from 0 to 1. Preferably the average value of a is either 0 or 1.

The average value of b may be a whole or fractional number in the range of from 0 to 2. Often the average value of b is in the range of from 0 to 1. Preferably the average value of b is 1.

When the value of a is zero for any particular compound, the —$(CH_2)_aH$ group is hydrogen. When the value of a is 1, the group is methyl. In an analogous manner, when the value of b is 0 for any particular compound, the —$(CH_2)_bH$ group is hydrogen. When the value of b is 1 for any particular compound, the group is methyl. When the value of b is 2 for any particular compound, the group is ethyl. Although the values of a and b will each independently be a whole number for any particular compound, the average values of these quantities for mixtures of compounds may be whole or fractional numbers.

The values of a and b may be determined analytically or, as is most often the case, by a knowledge of the structures of the materials used to prepare the ethylenically unsaturated polyether.

The average value of n for the ethylenically unsaturated polyether is in the range of from 1 to 30. Typically it is in the range of from 1 to 20. In many cases it is in the range of from 3 to 17. Preferably the average value of n is in the range of from 6 to 12.

The value of n for any particular compound will be a positive integer, while the average value of n for a mixture of compounds constituting the ethylenically unsaturated polyether may be a positive integer or a positive number which is not an integer. In the case of a mixture, the value of n for an individual compound may be in the foregoing range or it may be above or below this range provided the average value for the mixture is within the range. When the average values of a and b are known, the average value of n for the ethylenically unsaturated polyether may be calculated from the number average molecular weight.

The number average molecular weight may be found experimentally or calculated from the distribution of individual compounds, if this is known, using the equalities:

$$\overline{M}_n = \frac{\sum M_k N_k}{\sum N_k} = \frac{\sum w_k}{\sum m_k}$$

where:

$\overline{M}_n$ is the number average molecular weight;

$M_k$ is the molecular weight of molecules of species k;

$N_k$ is the number of molecules of species k;

$w_k$ is the mass, expressed in grams, of molecules of species k; and $m_k$ is the mass, expressed in gram-moles, of molecules of species k.

From a consideration of the permissible values of a and b, subclasses of compounds within the formula are:

poly(ethylene oxide) monoacrylate [CAS 26403-58-7]

poly(ethylene oxide) monomethacrylate [CAS 25736-86-1]

poly(ethylene oxide) methyl ether acrylate [CAS 32171-39-4]

poly(ethylene oxide) methyl ether methacrylate [CAS 26915-72-0]

poly(ethylene oxide) ethyl ether acrylate [CAS 35111-38-7]

poly(ethylene oxide) ethyl ether methacrylate [CAS 35625-93-5]

The proportions of N-vinyl-2-pyrrolidinone and ethylenically unsaturated polyether individually present in the ethylenically unsaturated monomers which are addition polymerized to form the addition copolymer may vary widely.

Usually N-vinyl-2-pyrrolidinone constitutes from 20 to 80 percent by weight of the ethylenically unsaturated monomers which are addition polymerized to form the addition copolymer. Frequently N-vinyl-2-pyrrolidinone constitutes from 30 to 70 percent by weight of the euhylenically unsaturated monomers which are addition polymerized. From 40 to 60 percent by weight is preferred.

Generally the ethylenically unsaturated polyether constitutes from 20 to 80 percent by weight of the ethylenically unsaturated monomers which are addition polymerized to form the addition copolymer. Frequently the ethylenically unsaturated polyether constitutes from 30 to 70 percent by weight of the ethylenically unsaturated monomers which are addition polymerized. From 40 to 60 percent by weight is preferred.

The proportions of N-vinyl-2-pyrrolidinone and ethylenically unsaturated polyether collectively present in the ethylenically unsaturated monomers which are addition polymerized to form the addition copolymer may vary considerably.

Ethylenically unsaturated monomers other than N-vinyl-2-pyrrolidinone and the ethylenically unsaturated polyether may optionally be present. Examples of such optional monomers include:

N-vinyl-1,3-dioxolane [CAS 3984-22-3] and

N-vinylcaprolactam [CAS 2235-00-9].

The N-vinyl-2-pyrrolidinone and the ethylenically unsaturated polyether collectively usually constitute at least 90 percent by weight of the ethylenically unsaturated monomers which are addition polymerized to form the addition copolymer. Frequently the N-vinyl-2-pyrrolidinone and the ethylenically unsaturated polyether collectively constitute at least 95 percent by weight of the ethylenically unsaturated monomers which are addition polymerized. Often the N-vinyl-2-pyrrolidinone and the ethylenically unsaturated polyether collectively constitute at least 98 percent by weight of the ethylenically unsaturated monomers which are addition polymerized. Preferably the ethylenically unsaturated monomers which are addition polymerized consist of the N-vinyl-2-pyrrolidinone and the ethylenically unsaturated polyether; that is, the N-vinyl-2-pyrrolidinone and the ethylenically unsaturated polyether collectively constitute substantially 100 percent by weight of the ethylenically unsaturated monomers which are addition polymerized.

The water-soluble or water-dispersible addition copolymer may be made by solution polymerization in a water-isopropanol solvent initiated by 2,2'-azobis(2-methylbutanenitrile) [CAS 13472-08-7]. The polymerization is conducted at temperatures in the range of from 75° C. to 80° C. for about 5 hours, followed by removal of the isopropanol-water azeotrope under reduced pressure until the isopropanol content of the composition is less than about 1 percent by weight.

Upon application of the coating composition and drying to form a coating, the film-forming organic polymer of the coating composition becomes the matrix of hydrophilic organic polymer of the coating.

The amount of the film-forming organic polymer present in the interior coating may be the same as or different from the amount of the film-forming organic polymer present in the exterior coating.

Usually the film-forming organic polymer of the interior coating composition and/or the exterior coating composition constitutes at least 1 percent by weight of the of the respective coating composition. Generally the film-forming organic polymer constitutes at least 3 percent by weight of the coating composition. In many instances the film-forming organic polymer constitutes at least 5 percent by weight of the coating composition. Often the film-forming organic polymer constitutes from 1 to 40 percent by weight of the coating composition. Frequently the film-forming organic polymer constitutes from 2 to 30 percent by weight of the coating composition. In many cases the film-forming organic polymer constitutes from 3 to 20 percent by weight of the coating composition.

Similarly, the amount of the matrix present in the interior water-absorptive coating may be the same as or different from the amount of the matrix present in the exterior water-absorptive coating.

The amounts of the matrix present in the interior water-absorptive coating and in the exterior water-absorptive coating may vary widely. Usually the matrix constitutes at least 15 percent by weight of the of the coating. In many instances the matrix constitutes at least 40 percent by weight of the coating. Often the matrix constitutes from 15 to 99 percent by weight of the coating. Frequently the matrix constitutes from 40 to 95 percent by weight of the coating. In many cases the matrix constitutes from 55 to 90 percent by weight of the coating.

The interior coating composition, the exterior coating composition, and hence the interior water-absorptive coating and the exterior water-absorptive coating each comprise discrete nonfilm-forming particles (that is, discrete particles which do not form films) having a number average particle size in the range of from 1 to 500 nanometers. The number average particle size of the discrete nonfilm-forming particles present in the interior coating composition and the interior coating may be the same as or different from the number average particle size of the discrete nonfilm-forming particles present in the exterior coating composition and the exterior coating. The number average particle size of the discrete nonfilm-forming particles is in the range of from 1 to 500 nanometers. Often the number average particle size is in the range of from 1 to 100 nanometers. Frequently the number average particle size is in the range of from 1 to 50 nanometers. Preferably the number average particle size is in the range of from 1 to 30 nanometers.

As used herein and in the claims number average particle size is determined by transmission electron microscopy.

The discrete nonfilm-forming particles may be nonfilm-forming inorganic particles, nonfilm-forming thermoset organic particles, substantially nonfilm-forming thermoplastic organic polymer particles, or a mixture of two or more thereof.

The discrete nonfilm-forming inorganic particles which may be present often comprise discrete nonfilm-forming particles of metal oxide. The metal oxide constituting the particles may be a simple metal oxide (i.e., the oxide of a single metal) or it may be a complex metal oxide (i.e., the oxide of two or more metals). The particles of metal oxide may be particles of a single metal oxide or they may be a mixture of different particles of different metal oxides.

Examples of suitable metal oxides include alumina, silica, and titania. Further examples of suitable metal oxides include cerium oxide, tin oxide, and zinc oxide. Other oxides may optionally be present in minor amount. Examples of such optional oxides include, but are not limited to, zirconia, hafnia, and yttria. Yet other metal oxides that may optionally be present are those which are ordinarily present as impurities such as for example, iron oxide. For purposes of the present specification and claims, silicon is considered to be a metal.

When the discrete nonfilm-forming particles are particles of alumina, most often the alumina is alumina monohydroxide. Particles of alumina monohydroxide, AlO(OH), and their preparation are known. The preparation and properties of alumina monohydroxide are described by B. E. Yoldas in *The American Ceramic Society Bulletin,* Vol. 54, No. 3, (March 1975), pages 289–290, in *Journal of Applied Chemical Biotechnology,* Vol. 23 (1973), pages 803–809, and in *Journal of Materials Science,* Vol. 10 (1975), pages 1856–1860. Briefly, aluminum isopropoxide or aluminum secondary-butoxide are hydrolyzed in an excess of water with vigorous agitation at from 75 C. to 80° C. to form a slurry of aluminum monohydroxide. The aluminum monohydroxide is then peptized at temperatures of at least 80° C. with an acid to form a clear alumina monohydroxide sol which exhibits the Tyndall effect when illuminated with a narrow beam of light. Since the alumina monohydroxide of the sol is neither white nor colored, it is not a pigment and does not function as a pigment in the present invention. The acid employed is noncomplexing with aluminum, and it has sufficient strength to produce the required charge effect at low concentration. Nitric acid, hydrochloric acid, perchloric acid, acetic acid, chloroacetic acid, formic acid and methacrylic acid meet these requirements. The acid concentration is usually in the range of from 0.03 to 0.1 mole of acid per mole of aluminum alkoxide. Although it is desired not to be bound by any theory, it is believed that the alumina monohydroxide produced in this manner is pseudoboehmite. Pseudoboehmite is indeed the preferred alumina monohydroxide for use in the present invention. The alumina monohydroxide is not a pigment and does not function as a pigment in the present invention. In most instances the alumina monohydroxide is transparent and colorless.

Colloidal silica is also known. Its preparation and properties are described by R. K. Iler in *The Chemistry of Silica,* John Wiley & Sons, Inc., New York (1979) ISBN 0-471-02404-X, pages 312–337, and in U.S. Pat. Nos. 2,601,235; 2,614,993; 2,614,994; 2,617,995; 2,631,134; 2,885,366; and 2,951,044, the disclosures of which are, in their entireties, incorporated herein by reference. Examples of commercially available colloidal silica include Ludox® HS, LS, SM, TM and CL-X colloidal silica (E. I. du Pont de Nemours & Company, Inc., Wilmington, Del., USA) in which the counter ion is the sodium ion, and Ludox® AS colloidal silica (E. I. du Pont de Nemours & Company, Inc.) in which the counter ion is the ammonium ion. Another example is Ludox® AM colloidal silica (E. I. du Pont de Nemours & Company, Inc.) in which some of the silicon atoms have been replaced by aluminum atoms and the counter ion is the sodium ion.

Colloidal titania is also known. Its preparation and properties are described in U.S. Pat. No. 4,275,118. Colloidal titania may also be prepared by reacting titanium isopropoxide [CAS 546-68-9] with water and tetramethyl ammonium hydroxide.

Discrete thermoset organic filler particles which may be present are particles of organic polymer crosslinked at least to the extent that they cannot be significantly softened or remelted by heat. The thermoset organic filler particles are not film-forming. Examples of such thermoset organic polymer particles include particles of thermoset melamine-aldehyde polymer, thermoset resorcinol-aldehyde polymer, thermoset phenol-resorcinol-aldehyde polymer, thermoset (meth)acrylate polymer, or thermoset styrene-divinylbenzene polymer.

The discrete nonfilm-forming thermoplastic organic filler particles which may be present are thermoplastic in that they may be softened and/or melted at elevated temperatures. Nevertheless they are nonfilm-forming when used in accordance with this invention. Examples of suitable discrete nonfilm-forming thermoplastic organic polymer particles include polyethylene particles such as those contained in Poly Emulsion 316N30 sol (ChemCor Inc., Chester, N.Y., USA), maleated polypropylene particles such as those contained in Poly Emulsion 43C30 sol (ChemCor Inc.), and polyacrylate, polymethacrylate, polystyrene, and/or fluoropolymer particles made by microemulsion processes.

The discrete nonfilm-forming particles which have a number average particle size in the range of from 1 to 500 nanometers and which are present in the interior coating composition and in the exterior coating composition may be the same or different.

The amount of the discrete nonfilm-forming particles present in the interior coating composition may be the same as or different from the amount of the discrete nonfilm-forming particles present in the exterior coating composition.

The amounts of the discrete nonfilm-forming particles present in the interior coating composition and in the exterior coating composition may vary widely. Discrete nonfilm-forming particles usually constitute at least 0.02 percent by weight of a coating composition. In many instances the discrete nonfilm-forming particles constitute at least 0.2 percent by weight of the coating composition. Often the discrete nonfilm-forming particles constitute from 0.02 to 60 percent by weight of the coating composition. In many cases the discrete nonfilm-forming particles constitute from 0.2 to 50 percent by weight of the coating composition. Frequently the discrete nonfilm-forming particles constitute from 0.3 to 24 percent by weight of the coating composition. From 0.5 to 12 percent by weight is preferred.

The amount of the discrete nonfilm-forming particles present in the interior water-absorptive coating may be the same as or different from the amount of the discrete nonfilm-forming particles present in the exterior water-absorptive coating composition.

The amounts the discrete nonfilm-forming particles present in the interior water-absorptive coating and in the exterior water-absorptive coating may vary widely. Usually the discrete nonfilm-forming particles constitute at least 1 percent by weight of the coating. Often the discrete nonfilm-forming particles constitute at least 2 percent by weight of the coating. Frequently the discrete nonfilm-forming particles constitute from 1 to 85 percent by weight of the coating. In many cases the discrete nonfilm-forming particles constitute from 5 to 60 percent by weight of the coating. From 10 to 45 percent by weight is preferred.

A material which may optionally be present in a coating composition, and hence in the coating, is mordant. For purposes of the present specification and claims mordant is considered not to be a part of the film-forming organic polymer and the matrix. Mordants, also known as ink-fixing agents, are materials which interact, usually by reaction or absorption, with binder, dye, and/or pigment of the ink applied to the coated substrate. There are many available mordants which may be used. Suitable mordants include, but are not limited to, the poly(ethylenimines), the ethoxylated poly(ethylenimines), and other derivatives of poly(ethylenimine). Examples include Lupasol™ SC-61B ink-fixing agent (BASF Aktiengesellschaft), Lupasol™ SC-62J mordant (BASF Aktiengesellschaft), and Lupasol™ SC-86X mordant (BASF Aktiengesellschaft), Lupasol™ PS mordant (BASF Aktiengesellschaft), Lupasol™ G-35 mordant (BASF Aktiengesellschaft), and Lupasol™ FG mordant (BASF Aktiengesellschaft).

When used, the amount of mordant present in the coating composition may vary considerably. In such instances the weight ratio of the mordant to the film-forming organic polymer is usually in the range of from 0.5:100 to 30:100. Frequently the weight ratio is in the range of from 0.5:100 to 20:100. Often the weight ratio is in the range of from 1:100 to 10:100. From 2:100 to 5:100 is preferred. These ratios are on the basis of mordant dry solids and film-forming organic polymer dry solids. The weight ratio of the mordant to the matrix of the coating is substantially the same as the weight ratio of the mordant to the film-forming organic polymer of the corresponding coating composition.

Another material which may optionally be present in the coating composition is surfactant. For purposes of the present specification and claims surfactant is considered not to be a part of the film-forming organic polymer. There are many available surfactants and combinations of surfactants which may be used. Examples of suitable surfactants include, but are not limited to, Fluorad® FC-170-C surfactant (3M Company), Triton® X-405 surfactant (Union Carbide Corporation), Silwet® L-77 surfactant (OSI Specialties, Inc.), and Macol® OP-40 surfactant (BASF Aktiengesellschaft).

When used, the amount of surfactant present in the coating composition may vary considerably. In such instances the weight ratio of the surfactant to the film-forming hydrophilic organic polymer is usually in the range of from 0.01:100 to 10:100. In many instances the weight ratio is in the range of from 0.1:100 to 10:100. Often the weight ratio is in the range of from 0.2:100 to 5:100. From 0.5:100 to 2:100 is preferred. These ratios are on the basis of surfactant dry solids and film-forming hydrophilic organic polymer dry solids. The weight ratio of the surfactant to the matrix of the coating is substantially the same as the weight ratio of the surfactant to the film-forming organic polymer of the corresponding coating composition.

There are many other conventional adjuvant materials which may optionally be present in the coating composition. These include such materials as lubricants, waxes, plasticizers, antioxidants, organic solvents, lakes, and pigments. The listing of such materials is by no means exhaustive. These and other ingredients may be employed in their customary amounts for their customary purposes so long as they do not seriously interfere with good coating composition formulating practice.

The coating compositions are usually prepared by simply admixing the various ingredients. The ingredients may be mixed in any order. Although the mixing of liquid and solids is usually accomplished at room temperature, elevated temperatures are sometimes used. The maximum temperature which is usable depends upon the heat stability of the ingredients.

The coatings are formed by applying coating compositions using any conventional technique known to the art. These include spraying, spinning, curtain coating, dipping, rod coating, blade coating, roller application, size press, printing, brushing, drawing, slot-die coating, cascade coating, and extrusion.

Exterior coating composition may be applied to the interior coating with or without significant removal of first volatile aqueous liquid from the interior coating prior to the application.

The same coating composition may be applied once or a multiplicity of times. When the same coating composition is applied a multiplicity of times, the applied coating composition may be applied with or without significant prior removal of volatile aqueous liquid from the previous coating or coatings.

Following application of a coating composition, volatile aqueous liquid may be partially or totally removed from one or more of the coatings. Following final application of the final coating composition, volatile aqueous liquid is partially or totally removed from one or more of the coatings. This may be accomplished by any conventional drying technique.

The thickness of the interior coating may vary widely, but in most instances the thickness of the interior coating is in the range of from 1 to 30 μm. In many cases the thickness of the interior coating is in the range of from 2 to 20 μm. From 4 to 18 μm is preferred.

Similarly, the thickness of the exterior coating may vary widely, but usually the thickness of the exterior coating is in the range of from 0.1 to 10 μm. Frequently the thickness of the exterior coating is in the range of from 0.5 to 5 μm. From 0.7 to 3 μm is preferred.

If the hydrophilic organic polymer of the exterior water-absorptive coating contains optional ethylenic unsaturation, then after the interior water-absorptive coating and the exterior coating have been formed on the surface of the substrate, they may be exposed to actinic light, ionizing radiation, or heat to provide the exterior coating with numerous crosslinks derived from ethylenic unsaturation. The source of the ethylenic unsaturation is ethylenically unsaturated groups present in the hydrophilic organic polymer of the exterior coating. This process is known as "curing". Some or substantially all of the ethylenically unsaturated groups may be converted to crosslinks, as desired. The numbers of crosslinks present in the exterior coating may vary considerably depending upon the effect desired.

It is ordinarily preferred that the interior coating be substantially free from crosslinks derived from ethylenic unsaturation or that it contain few crosslinks derived from ethylenic unsaturation.

When the exterior coating is to be exposed to actinic light, photoinitiator, photosensitizer, or a mixture of photoinitiator and photosensitizer is usually present. Usually the actinic light is ultraviolet light having a wavelength in the range of from about 185 to about 400 nanometers.

Photoinitiators are compounds which absorb photons and thereby obtain energy to form radical pairs, at least one of which is available to initiate addition polymerization of ethylenically unsaturated groups in the well-known manner. Photosensitizers are compounds which are good absorbers of photons, but which are themselves poor photoinitiators. They absorb photons to produce excited molecules which then interact with a second compound to produce free radicals suitable for initiation of addition polymerization. The second compound may be a monomer, a polymer or an added initiator. Examples of photoinitiators are benzoin, methyl benzoin ether, butyl benzoin ether, isobutyl benzoin ether, α,α-diethoxyacetophenone and α-chloroacetophenone. Examples of photosensitizers are benzil, 1-naphthaldehyde, anthraquinone, benzophenone, 3-methoxybenzophenone, benzaldehyde, and anthrone.

The amount of photoinitiator, photosensitizer or mixture of photoinitiator and photosensitizer present in the exterior coating composition and the exterior coating can vary widely. When any of these materials is present, the amount is usually in the range of from 0.001 to 10 percent by weight of the binder of the coating composition and matrix of the exterior coating. Most often, the amount is in the range of from 0.002 to 8 percent by weight of the binder or matrix. An amount in the range of from 0.005 to 5 percent by weight of the binder or matrix is preferred. When the exterior coating is to be exposed to ionizing radiation, these materials are usually omitted from the exterior coating composition and hence from the exterior coating, although their presence is permissible.

Any-suitable source which emits ultraviolet light, viz., electromagnetic radiation having a wavelength in the range of from about 180 to about 400 nanometers, may be used in the practice-of this invention. Because such ultraviolet light possesses insufficient energy to produce ions in a medium composed of common elements such as air or water, it is considered to be nonionizing radiation. Suitable sources of ultraviolet light are mercury arcs, carbon arcs, low pressure mercury lamps, medium pressure mercury lamps, high pressure mercury lamps, swirlflow plasma arc, and ultraviolet light emitting diodes. Particularly preferred are ultraviolet light emitting lamps of the medium or high pressure mercury vapor type. Such lamps usually have fused quartz envelopes to withstand the heat and to transmit the ultraviolet radiation and are ordinarily in the form of long tubes having an electrode at both ends.

The times of exposure to actinic light and the intensity of the actinic light to which the polymerizable composition is exposed may vary greatly. Usually the exposure to actinic light is continued at least until many, and in some cases, most, of the photoinitiator and/or photosensitizer molecules have been activated.

The ionizing radiation employed is radiation possessing an energy at least sufficient to produce ions either directly or indirectly in a medium composed of common elements such as air or water, and includes ionizing particle radiation and ionizing electromagnetic radiation. Ionizing particle radiation designates the emission of electrons or accelerated nuclear particles such as protons, alpha particles, deuterons, beta particles, neutrons or their analogs. Charged particles can be accelerated using such devices as resonance chamber accelerators, DC potential gradient accelerators, betatrons, synchrotrons, cyclotrons, etc. Neutron radiation can be produced by bombarding a selected light metal such as beryllium with positively charged particles of high energy. Ionizing particle radiation can also be obtained by the use of an atomic pile, radioactive isotopes, or other natural or synthetic radioactive materials. Ionizing electromagnetic radiation comprises high energy photons. Examples are X-rays, bremsstrahlung, and gamma rays.

X-rays may be produced when a metallic target such as tungsten, copper, or molybdenum is bombarded with electrons of suitable energy. This energy is conferred to the electrons by accelerators, usually, but not necessarily, of the linear type. Traveling wave linear accelerators, standing wave linear accelerators and DC potential gradient linear accelerators are ordinarily employed for this purpose.

Bremsstrahlung, also known as continuous X-rays, is produced by the deceleration of electrons. The continuum extends from a short-wave limit dependent upon the maximum energy of the electrons indefinitely toward the long wavelength end of the spectrum.

Gamma rays may be obtained by means of a nuclear reactor, such as a pile, by the use of natural or synthetic radioactive materials such as cobalt 60 or radium which emit gamma rays, or by absorption of a neutron in the (n,γ) reaction.

The ionizing radiation, whether particle radiation or electromagnetic radiation, ordinarily has an energy of at least about 10 electron volts. While there is no upper limit to the energy of ionizing radiation which can be used advantageously, the effects desired in the practice of this invention can be accomplished without resorting to the use of ionizing radiation having energies above about 20,000,000 electron volts.

Accelerated electrons is the preferred ionizing radiation for crosslinking coatings of the radiation curable coating composition. Bremsstrahlung generated by the deceleration) of the electrons is also present and probably contributes to crosslinking. Various types of linear electron accelerators are known, for example, the ARCO type traveling wave accelerator, model Mark I, operating at 3 to 10 million electron volts supplied by High Voltage Engineering Corporation, Burlington, Mass., or other types of accelerators such as are described in U.S. Pat. No. 2,763,609 and British Patent Specification No. 762,953 are satisfactory for the practice of this invention. Usually the electrons are accelerated to energies in the range of from about 10,000 electron volts to about 1,000,000 electron volts. Typically, the energy is in the range of from about 20,000 electron volts to about 500,000 electron volts. Preferably, the energy is in the range of from about 25,000 electron volts to about 200,000 electron volts.

The unit of dose of ionizing radiation is the "rad" which is equal to 100 ergs of energy absorbed from ionizing radiation per gram of material being irradiated. Dose is initially determined using an absolute method such as calorimetry or ionization dosimetry. These absolute methods are quite sophisticated and hence are not generally practical for routine determinations. Once a radiation field has been explored by an absolute method of dosimetry, it is possible to calibrate secondary radiation indicators in that field using relative dosimetry techniques. One simple method of relative dosimetry is based upon the bleaching of blue cellophane by ionizing radiation. The blue cellophane is exposed to a standard source for a known time and the transmittance of light having a wavelength of 655 nanometers is measured with a spectrophotometer. The transmittance of unexposed cellophane is also measured and the percent change in transmittance due to exposure to ionizing radiation is calculated. From several such readings and calculations, a graph may be constructed relating change in transmittance with dose. A blue cellophane manufactured by the E. I. du Pont de Nemours & Company has been used for this purpose. The calibrated blue cellophane may then be used to calibrate other sources of the same kind of radiation and other kinds of blue cellophane which may be used in routine work. Avisco cellophane 195 CMS light blue manufactured by the American Viscose Division of FMC Corporation has been calibrated and used for routine dose determinations. In practice, the calibrated blue cellophane is exposed to the ionizing radiation before, after or simultaneously with the coated substrate being irradiated. The dose received by the coating is considered to be the same as that received by the blue cellophane. This presumes that the absorption of energy by the coating is the same as that of the blue cellophane. Except for materials containing rather large proportions of atoms of very high atomic weight, the absorption of ionizing radiation is nearly independent of the identity of the material. The presumption is therefore valid for the ordinary work of coatings manufacturing where very high degrees of accuracy of dose measurement are not needed. As used throughout the specification and claims, dose is referenced to the bleaching of calibrated blue cellophane film irrespective of the identity of the coating composition being irradiated.

Coatings of the radiation curable coating composition ordinarily receive a dose of ionizing radiation in the range of from about 0.01 megarad to about 20 megarads, although doses greater than 20 megarads may be used satisfactorily. The dose, however, should not be so great that the chemical or physical properties of the coating are seriously impaired. Typically, the dose is in the range of from about 0.1 megarad to about 20 megarads. The preferred dose is in the range of from about 1 megarad to about 10 megarads.

The free radical curing of ethylenically unsaturated groups of many, but not all, coatings containing such groups is significantly inhibited by oxygen when the coatings are exposed to actinic light or ionizing radiation. In such instances the surface of the coating remains undercured. Often the oxygen inhibition is so severe that even massive exposures to very large amounts of actinic light or ionizing radiation will not cure the surface to the desired degree. When the coating has sufficient thickness and when the coating is exposed to actinic light or ionizing radiation, oxygen inhibition can result in a surface layer of the coating having a significantly lesser degree of cure than the interior of the coating.

When oxygen inhibition does occur the effect can sometimes be reduced by the inclusion of materials which inhibit oxygen inhibition. Oxygen inhibition can always be reduced by sufficiently lowering the molecular oxygen concentration of the atmosphere in contact with the coating during exposure.

Controlling oxygen inhibition can in some instances be used to vary the degree of curing in a manner that enhances wet smear resistance of the printing medium. Parameters which affect oxygen inhibition can often be used to vary wet smear resistance. Included among these are the identities of the polymers, oligomers, and monomers of the coating composition, the concentration of molecular oxygen in the atmosphere in which exposure to radiation takes place, and the intensity of the actinic light or ionizing radiation. In the case of actinic light, the identities and amounts of actinic light absorbers can sometimes be used. See U.S. Pat. No. 4,170,663, the entire disclosure of which is incorporated herein by reference, for a discussion of general principles.

When the ethylenically unsaturated groups of the exterior intermediate coating are to be polymerized by heating the exterior intermediate coating to elevated temperatures, thermal initiator is usually present.

The thermal initiators which may be used in the present invention may be widely varied, but in general they are thermally decomposable to produce radical pairs. One or both members of the radical pair are available to initiate addition polymerization of ethylenically unsaturated groups in the well-known manner.

The preferred thermal initiators are peroxy initiators. Examples of suitable peroxy initiators include peroxydicarbonate esters such as di-n-propyl peroxydicarbonate, diisopropyl peroxydicarbonate, di-n-butyl peroxydicarbonate, di-sec-butyl peroxydicarbonate, diisobutyl peroxydicarbonate, di(2-ethylhexyl) peroxydicarbonate, diacetyl peroxy dicarbonate, dicyclohexyl peroxydicarbonate, di(4-tert-butylcyclohexyl) peroxy dicarbonate, and isopropyl sec-butyl peroxydicarbonate; diacetyl peroxides such as diacetyl peroxide, dibenzoyl peroxide, dilauroyl peroxide, and diisobutyryl peroxide; and peroxy esters such as tertiary-butyl perpivalate, tertiary-butyl peroctoate, and tertiary-butyl perneodecanoate.

Other examples of suitable peroxy initiators include monoperoxycarbonates such as tertiary-butylperoxy isopropyl carbonate and tertiary-amyl peroxyisopropyl carbonate.

Only one initiator or a plurality of thermal initiators may be used as desired.

The amount of thermal initiator present in the exterior coating composition and the exterior intermediate coating can vary widely. When thermal initiator is present, the amount is usually in the range of from 0.001 to 10 percent by weight of the binder of the coating composition and the exterior intermediate coating. Most often, the amount is in the range of from 0.01 to 8 percent by weight of the binder. An amount in the range of from 0.1 to 5 percent by weight of the binder is preferred.

Usually thermal polymerization is conducted at temperatures in the range of from 28° C. to 150° C. Often the temperature is in the range of from 35° C. to 140° C. In many instances the temperature is in the range of from 50° C. to 130° C.

The times of exposure to elevated temperatures may vary greatly. Generally, heating is continued until most of the ethylenically unsaturated groups are polymerized.

The coatings may collectively be substantially transparent, substantially opaque, or of intermediate transparency. They may be substantially colorless, they may be highly colored, or they may be of an intermediate degree of color. Preferably the coatings are substantially transparent and substantially colorless. As used herein and in the claims, the coatings are collectively transparent if their luminous transmission in the visible region is at least 80 percent of the incident light. Often the luminous transmission of the coating is at least 85 percent of the incident light. Preferably the collective luminous transmission of the coatings is at least 90 percent. Also as used herein and in the claims, the coatings are collectively colorless if the luminous transmission is substantially the same for all wavelengths in the visible region, viz., 400 to 800 nanometers.

The gloss of the exterior water-absorptive coating of the printing medium may vary widely. Although lower glosses are acceptable for many purposes, it is preferred that the gloss be at least 20. As used herein gloss is determined according to TAPPI Standard T653 pm-90.

The water-absorptive exterior coating may optionally be printed upon by applying liquid ink droplets to the exterior water-absorptive coating. This is most often accomplished by inkjet printing.

A second embodiment of the invention is a printing medium comprising: (a) a substrate having at least one surface; (b) a first interior water-absorptive coating on a surface of the substrate wherein the interior water-absorptive coating comprises: (1) a matrix of hydrophilic organic polymer which contains from 0 to 30 percent by weight nitrogen-containing substance, and (2) discrete nonfilm-forming particles which have a number average particle size in the range of from 1 to 500 nanometers and which are distributed throughout the matrix of the interior water-absorptive coating; (c) a second interior water-absorptive coating on the first interior water-absorptive coating wherein the second interior water-absorptive coating comprises: (1) a matrix of hydrophilic organic polymer which contains from 10 to 50 percent by weight nitrogen-containing substance, and (2) discrete nonfilm-forming particles which have a number average particle size in the range of from 1 to 500 nanometers and which are distributed throughout the matrix of the interior water-absorptive coating; and (d) an exterior water-absorptive coating on the second interior water-absorptive coating wherein the exterior water-absorptive coating comprises: (1) a matrix of hydrophilic organic polymer which contains from 0 to 30 percent by weight nitrogen-containing substance, and (2) discrete nonfilm-forming particles which have a number average particle size in the range of from 1 to 500 nanometers and which are distributed throughout the matrix of the exterior water-absorptive coating; wherein: (e) each nitrogen-containing substance is independently selected from the group consisting of quaternary ammonium mer units, poly(N-vinylpyrrolidinone), copolymer of N-vinylpyrrolidinone and α-(meth)acrylyloxy-ω-(hydroxy, methoxy, or ethoxy)-poly(ethylene oxide), and two or more thereof; (f) the hydrophilic organic polymer of the second interior water-absorptive coating contains a greater quantity of nitrogen-containing substance than the hydrophilic organic polymer of the first interior water-absorptive coating, on a percent by weight basis; and (g) the hydrophilic organic polymer of the second interior water-absorptive coating contains a greater quantity of nitrogen-containing substance than the hydrophilic organic polymer of the exterior water-absorptive coating, on a percent by weight basis.

This second embodiment may be viewed either as (1) the first embodiment wherein the substrate itself comprises a coating on which the interior water-absorptive coating is formed, or (2) as the first embodiment modified by the inclusion of an intermediate water-absorptive coating between the substrate and the interior water absorptive coating.

The above descriptions of the substrate, the interior coating composition, the interior water-absorptive coating, the exterior coating composition, and the exterior water-absorptive coating in respect of the first embodiment are applicable respectively to the substrate, the second interior coating composition, the second interior water-absorptive coating, the exterior coating composition, and the exterior water-absorptive coating of the second embodiment.

The above descriptions of the exterior coating composition and the exterior water-absorptive coating in respect of the first embodiment are applicable respectively to the first interior coating composition and the first interior water-absorptive coating of the second embodiment. It is preferred, however, that the hydrophilic organic polymer of the first interior coating composition contain substantially no ethylenic unsaturation and that the first interior water-absorptive coating be substantially free from crosslinks derived from ethylenic unsaturation.

The first interior water-absorptive coating, the second interior water-absorptive coating, and the exterior water-absorptive coating comprise hydrophilic organic polymer. The main differences are (a) the hydrophilic organic polymer of the second interior water-absorptive coating contains more nitrogen-containing substance than the hydrophilic organic polymer of the first interior water-absorptive coating, and (b) the hydrophilic organic polymer of the second interior water-absorptive coating contains more nitrogen-containing substance than the hydrophilic organic polymer of the exterior water-absorptive coating. Usually, but not necessarily, the difference between the quantity of nitrogen-containing substance of the hydrophilic organic polymer of the second interior coating expressed as percent by weight and the quantity of nitrogen-containing substance of the hydrophilic organic polymer of the first interior coating expressed as percent by weight, is at least 0.1 percent. Often the difference is at least 1 percent. In many cases the difference is at least 5 percent. Preferably the difference is at least 10 percent. Usually, but not necessarily, the difference between the quantity of nitrogen-containing substance of the hydrophilic organic polymer of the second interior coating expressed as percent by weight and the quantity of nitrogen-containing substance of the hydrophilic organic polymer of the exterior coating expressed as percent by weight, is at least 0.1 percent. Often the difference is at least 1 percent. In many cases the difference is at least 5 percent. Preferably the difference is at least 10 percent. These differences are formed by simple subtraction of the two percentages.

The substrate may be coated sequentially with the first interior coating composition, the second interior coating composition, and the exterior coating composition, and volatile aqueous liquid may be removed substantially or in part after application of one or more of the coating compositions. Removal of substantially all of the volatile aqueous liquid present after final application of the exterior coating composition, is preferred.

The invention is further described in conjunction with the following examples which are to be considered illustrative rather than limiting, and in which all parts are parts by weight and all percentages are percentages by weight unless otherwise specified.

EXAMPLE 1

The charges shown in Table 1 were used in the preparation of an aqueous secondary ammonium cationic polymer composition.

TABLE 1

| Ingredients | Weight, kilograms |
|---|---|
| Charge 1 | |
| Methyl ethyl ketone | 55.93 |
| Charge 2 | |
| Methyl ethyl ketone | 28.67 |
| Initiator[1] | 10.16 |
| Charge 3 | |
| n-Butyl acrylate | 30.44 |
| Methyl methacrylate | 87.32 |
| 2-(tert-Butylamino) ethyl methacrylate [CAS 3775-90-4] | 40.64 |
| Styrene | 44.68 |
| Charge 4 | |
| Methyl ethyl ketone | 2.27 |
| Charge 5 | |
| Methyl ethyl ketone | 2.27 |
| Charge 6 | |
| Glacial acetic acid | 9.89 |
| Methyl ethyl ketone | 2.27 |
| Charge 7 | |
| Deionized water | 579.1 |
| Charge 8 | |
| Deionized water | 11.1 |

[1]VAZO ® 67 2,2'-Azobis (2-methylbutanenitrile) initiator, E. I. du Pont de Nemours and Company, Wilmington, Delaware.

Charge 1 was heated in a reactor with agitation to reflux temperature (80° C.). The addition of Charge 2 from a catalyst tank to the reactor was then begun. The addition of Charge 2 was made over a period of 305 minutes. Five minutes after beginning the addition of Charge 2, the addition of Charge 3 from a monomer tank was begun. The addition of Charge 3 was made over a period of 240 minutes. When the addition of Charge 3 was completed, Charge 4 was added to the monomer tank as a rinse and then the rinse liquid was added from the monomer tank to the reactor over a period of 10 minutes. Upon completion of the addition of Charge 2, Charge 5 was added to the catalyst tank as a rinse and then the rinse liquid was added from the catalyst tank to the reactor over a period of 10 minutes. The reaction mixture was then agitated at reflux for three hours while the temperature of the reaction mixture was in the range of from 83° C. to 86° C. At the end of the three hour period, the reaction mixture was cooled to temperatures in the range of from 48° C. to 52° C. Charge 6 was added over a period of 10 minutes and the reaction mixture was thereafter agitated for 15 minutes. Charge 7 was added to a thinning tank equipped for distillation and heated to temperatures in the range of from 48° C. to 52° C. The reaction mixture was dropped from the reactor to the thinning tank as quickly as possible. Charge 8 was added to the reactor as a rinse and then the rinse liquid was also dropped to the thinning tank. The contents of the thinning tank were agitated for 30 minutes at temperatures in the range of from 48° C. to 52° C. Over a thirty minute period the pressure was reduced to 71.3 kilopascals, absolute. The temperature was then increased and liquid was stripped off under vacuum until the solids content of the batch was about 29 percent by weight. The resulting product which was an aqueous secondary ammonium cationic polymer composition, was cooled to about 48° C., filtered, and then discharged into drums.

The charges shown in Table 2 were used in the preparation of an aqueous quaternary ammonium cationic polymer composition.

TABLE 2

| Ingredients | Weight, grams |
|---|---|
| Charge 1 | |
| Deionized water | 100.0 |
| Aqueous isopropanol[1] | 200.0 |
| Initiator[2] | 5.0 |
| Charge 2 | |
| Methyl methacrylate | 20.0 |
| Styrene | 20.0 |
| n-Butyl acrylate | 15.0 |
| Aqueous quaternary monomer[3] | 56.3 |
| Aqueous isopropanol[1] | 150.0 |

[1]70% isopropanol, 30% water, by weight.
[2]VAZO ® 67 2,2'-Azobis (2-methylbutanenitrile) initiator, E. I. du Pont de Nemours and Company, Wilmington, Delaware.
[3]80% [2-(methacryloyloxy) ethyl]trimethyl ammonium methylsulfate, 20% water, by weight.

Charge 1 was heated to 75° C. Charge 2 was introduced to Charge 1 at 75° C. over a period of 3 hours. The reaction mixture was then stirred for 5 hours at 80° C. The isopropanol was removed by stripping on a Rotovapor® rotary evaporator at 60° C. Water was added to provide a first aqueous quaternary ammonium cationic polymer composition having a solids content of 25.5% by weight.

An aqueous poly(ethylene oxide) solution was prepared by dissolving 60 grams of Alkox® E-30 poly(ethylene oxide) (Meisei Chemical Works, Ltd., Kyoto, Japan) having a weight average molecular weight of about 300,000 to 450,000 in 940 grams of deionized water.

Under stirring, 140 grams of pseudoboehmite powder Disperal® Sol P2 (Condea Chemie GmbH, Hamburg, Germany) was gradually added to 860 grams of diluted nitric acid aqueous solution (0.25%) under stirring. The mixture was stirred until a translucent aqueous pseudoboehmite dispersion was obtained.

To a plastic container was added 241.5 grams of the above aqueous poly(ethylene oxide) solution. While the solution was under stirring, 22.6 grams of the above aqueous secondary ammonium cationic polymer composition, 79.5 grams of the above aqueous pseudoboehmite dispersion, and 20.0 grams of the above first aqueous quaternary ammonium cationic polymer composition were sequentially added. After each addition the mixture was stirred until a homogeneous aqueous dispersion was obtained. The product was a first coating composition.

To another plastic container was added 200 grams of the above aqueous poly(ethylene oxide) solution. While the solution was under stirring, 25.3 grams of the above aqueous secondary ammonium cationic polymer composition, 60 grams of the above aqueous pseudoboehmite dispersion, 49.7 grams of the above first aqueous quaternary ammonium cationic polymer composition, and 9.9 grams of an aqueous solution of K15 poly(vinylpyrrolidone) having a molecular weight about 10000 (International Specialty Products, Wayne, N.J., USA) and containing 30 percent solids by weight were sequentially added. After each addition the mixture was stirred until a homogeneous aqueous dispersion was obtained. The product was a second coating composition.

To another plastic container, 297.4 grams of the above aqueous poly(ethylene oxide) solution was added. While the solution was under stirring, 30 grams of the above aqueous secondary ammonium cationic polymer composition, 70 grams of the above aqueous pseudoboehmite dispersion, 3.3 grams of a Cymel® 1172 urea/glyoxal adduct containing 50 percent solids by weight (Cytec Technologies Inc., West Patterson, N.J., USA), 11.7 grams of a ChemCor® 540C cationic polyethylene emulsion containing 25 percent solids by weight (ChemCor, Chester, N.Y., USA) , and 12 grams of Sartomer® SR 502 triacrylate-terminated ethoxylated trimethylolpropane (Sartomer Company, Inc., West Chester, Pa. USA) were added. After each addition the mixture was stirred until a homogeneous dispersion was obtained. Next, 0.4 gram of Darocur® 1173 hydroxymethylphenylpropanone photoinitiator (Ciba-Geigy, Hawthorne, N.Y., USA) was added, and the dispersion was stirred for 10 minutes to produce a third coating composition.

A portion of the first coating composition was drawn own on Glory Base photograde basestock paper (Felix Schoeller, Germany) using a Meyer Rod #120. The wet coating was dried in an oven at 105° C. for 4 minutes to form a first coating on the substrate. The thickness of the first coating was about 12 $\mu$m. A portion of the second coating composition was drawn down on the first coating using a Meyer Rod #40. The wet coating was dried in the oven at 105° C. for 2 minutes to produce a second coating. The thickness of the second coating was about 5 $\mu$m. A portion of the third coating composition was drawn down on the second coating using a Meyer Rod #14. The wet coating was dried in the oven at 105° C. for 2 minutes to produce a third coating. The thickness of the third coating was in the range of 1 to 2 $\mu$m.

The substrate having the three coatings was passed once, at a speed of 21.3 meters/min, in an air atmosphere, under two mercury vapor arc lamps which were emitting ultraviolet light. The lamps were positioned 6 inches (15.24 cm) above the surface of the coated substrate as it passed under the lamps. The dose was 500 mJ/cm$^2$. The resulting product was a printing medium.

EXAMPLE 2

An ethylenically unsaturated quaternary ammonium chloride solution was prepared by admixing 3231 grams of an aqueous ethylenically unsaturated quaternary ammonium chloride solution (80% [(methacryloyloxy)ethyl] benzyldimethylammonium chloride [CAS 146248-59-1] and 20% water, by weight) and 1552 grams of 2-propanol.

A monomer solution was prepared by admixing 470 grams of methyl methacrylate, 706 grams of n-butyl acrylate, 940 grams of styrene, and 4783 grams of the above ethylenically unsaturated quaternary ammonium chloride solution.

An initiator solution was prepared by dissolving 141 grams of 2,2'-azobis(2-methylbutanenitrile) (Vazo® 67, E. I. du Pont de Nemours & Co., Wilmington, Del., USA) in 470 grams of 2-propanol.

A 22-liter glass reactor equipped with a thermometer, a nitrogen inlet, an agitator, and a reflux condenser, was charged with 470 grams of deionized water and 1410 grams of 2-propanol. All of the above initiator solution and all of the above monomer solution were pumped into the reactor at 80° C. under nitrogen over periods of 2 hours and 3 hours, respectively. After the additions were completed, stirring was continued for at least 15 hours at 80° C. to give a light yellow solution. 2-Propanol was distilled as an azeotrope under slightly reduced pressure (about 38 centimeters of water vacuum) at from 55° C. to 75° C. while 11.0 kilograms of deionized water was gradually introduced to the reactor and until no 2-propanol was detected in the polymer composition by gas chromatography. The polymer composition was diluted to 24.6% solids by weight with deionized water to yield a viscous translucent second aqueous quaternary ammonium cationic polymer composition which weighed 18.7 kilograms.

To a plastic container was added 240.4 grams of the aqueous poly(ethylene oxide) solution of Example 1. While the solution was under stirring, 96 grams of the aqueous secondary ammonium cationic polymer composition of Example 1, 152 grams of the aqueous pseudoboehmite dispersion of Example 1, 86.2 grams of the above second aqueous quaternary ammonium cationic polymer composition, and 12 grams of an aqueous solution of K15 poly(vinylpyrrolidone) having a molecular weight about 10000 (International Specialty Products, Wayne, N.J., USA) and containing 30 percent solids by weight were sequentially added. After each addition the mixture was stirred until a homogeneous aqueous dispersion was obtained. The product was a first coating composition.

To another plastic container was added 229.5 grams of the aqueous poly(ethylene oxide) solution of Example 1. While the solution was under stirring, 55.1 grams of the aqueous secondary ammonium cationic polymer composition of Example 1, 64.7 grams of the aqueous pseudoboehmite dispersion of Example 1, and 25 grams of deionized water were sequentially added. After each addition the mixture was stirred until a homogeneous aqueous dispersion was obtained. The product was a second coating composition.

A portion of the first coating composition was drawn own on Glory Base photograde basestock paper (Felix Schoeller, Germany) using a Meyer Rod #160. The wet coating was dried in an oven at 105° C. for 4 minutes to form a first coating on the substrate. The thickness of the first coating was about 16 μm. A portion of the second coating composition was drawn down on the first coating using a Meyer Rod #18. The wet coating was dried in the oven at 105° C. for 2 minutes to produce a second coating. The thickness of the second coating was in the range of 1 to 2 μm.

Although the present invention has been described with reference to specific details of certain embodiments thereof, it is not intended that such details should be regarded as limitations upon the scope of the invention except insofar as they are included in the accompanying claims.

What is claimed is:

1. A printing medium comprising:

(a) a substrate having at least one surface;

(b) a first interior water-absorptive coating on a surface of the substrate wherein the interior water-absorptive coating comprises:

(1) a matrix of hydrophilic organic polymer which contains from 0 to 30 percent by weight nitrogen-containing substance, and (2) discrete nonfilm-forming particles which have a number average particle size in the range of from 1 to 500 nanometers and which are distributed throughout the matrix of the interior water-absorptive coating;

(c) a second interior water-absorptive coating on the first interior water-absorptive coating wherein the second interior water-absorptive coating comprises:

(1) a matrix of hydrophilic organic polymer which contains from 10 to 50 percent by weight nitrogen-containing substance, and (2) discrete nonfilm-forming particles which have a number average particle size in the range of from 1 to 500 nanometers and which are distributed throughout the matrix of the interior water-absorptive coating; and (d) an exterior water-absorptive coating on the second interior water-absorptive coating wherein the exterior water-absorptive coating comprises:

(1) a matrix of hydrophilic organic polymer which contains from 0 to 30 percent by weight nitrogen-containing substance, and (2) discrete nonfilm-forming particles which have a number average particle size in the range of from 1 to 500 nanometers and which are distributed throughout the matrix of the exterior water-absorptive coating;

wherein:

(e) each nitrogen-containing substance is independently selected from the group consisting of quaternary ammonium mer units, poly(N-vinylpyrrolidinone), copolymer of N-vinylpyrrolidinone and α-(meth)acrylyloxy-ω-(hydroxy, methoxy, or ethoxy)-poly(ethylene oxide), and two or more thereof;

(f) the hydrophilic organic polymer of the second interior water-absorptive coating contains a greater quantity of nitrogen-containing substance than the hydrophilic organic polymer of the first interior water-absorptive coating, on a percent by weight basis; and (g) the hydrophilic organic polymer of the second interior water-absorptive coating contains a greater quantity of nitrogen-containing substance than the hydrophilic organic polymer of the exterior water-absorptive coating, on a percent by weight basis.

2. The printing medium of claim 1 wherein the substrate is porous throughout, nonporous throughout, or comprises both porous regions and nonporous regions.

3. The printing medium of claim 1 wherein the substrate is coated paper.

4. The printing medium of claim 1 wherein the substrate is substantially opaque.

5. The printing medium of claim 1 wherein the substrate is substantially transparent.

6. The printing medium of claim 1 wherein the hydrophilic organic polymer of at least one of the first interior water-absorptive coating, the second interior water-absorptive coating, and the exterior water-absorptive coating comprises poly(ethylene oxide), poly(vinyl alcohol), water-soluble cellulosic organic polymer, or a mixture of two or more thereof.

7. The printing medium of claim 1 wherein the hydrophilic organic polymer of the first interior water-absorptive coating, the hydrophilic organic polymer of the second interior water-absorptive coating, and the hydrophilic organic polymer of the exterior water-absorptive coating comprise poly(ethylene oxide).

8. The printing medium of claim 1 wherein the number average particle size of the discrete nonfilm-forming particles of at least one of the first interior water-absorptive coating, the second interior water-absorptive coating, and the exterior water-absorptive coating is in the range of from 1 to 100 nanometers.

9. The printing medium of claim 1 wherein the number average particle size of the discrete nonfilm-forming particles of at least one of the first interior water-absorptive coating, the second interior water-absorptive coating, and the exterior water-absorptive coating is in the range of from 1 to 30 nanometers.

10. The printing medium of claim 1 wherein the discrete nonfilm-forming particles of the first interior water-absorptive coating, the discrete nonfilm-forming particles of the second interior water-absorptive coating, and the discrete nonfilm-forming particles of the exterior water-absorptive coating each independently comprises nonfilm-forming inorganic particles, nonfilm-forming thermoset organic particles, substantially nonfilm-forming thermoplastic organic polymer particles, or a mixture of two or more thereof.

11. The printing medium of claim 1 wherein the discrete nonfilm-forming particles of at least one of the first interior water-absorptive coating, the second interior water-absorptive coating, and the exterior water-absorptive coating comprise discrete nonfilm-forming particles of metal oxide.

12. The printing medium of claim 11 wherein the metal oxide comprises alumina monohydroxide, silica, titania, or a mixture of two or more thereof.

13. The printing medium of claim 11 wherein the metal oxide comprises pseudoboehmite.

14. The printing medium of claim 1 wherein:

(a) the first interior coating is substantially free from crosslinks derived from ethylenic unsaturation or contains few crosslinks derived from ethylenic unsaturation;

(b) the second interior coating is substantially free from crosslinks derived from ethylenic unsaturation or contains few crosslinks derived from ethylenic unsaturation; and (c) the exterior water-absorptive coating contains numerous crosslinks derived from ethylenic unsaturation.

15. The printing medium of claim 1 wherein:

(a) the difference between the quantity of nitrogen-containing substance of the hydrophilic organic polymer of the second interior coating expressed as percent by weight and the quantity of nitrogen-containing substance of the hydrophilic organic polymer of the first interior coating expressed as percent by weight, is at least 0.1 percent, and (b) the difference between the quantity of nitrogen-containing substance of the hydrophilic organic polymer of the second interior coating expressed as percent by weight and the quantity of nitrogen-containing substance of the hydrophilic organic polymer of the exterior coating expressed as percent by weight, is at least 0.1 percent.

16. The printing medium of claim 1 wherein:

(a) the difference between the quantity of nitrogen-containing substance of the hydrophilic organic polymer of the second interior coating expressed as percent by weight and the quantity of nitrogen-containing substance of the hydrophilic organic polymer of the first interior coating expressed as percent by weight, is at least 1 percent, and (b) the difference between the quantity of nitrogen-containing substance of the hydrophilic organic polymer of the second interior coating expressed as percent by weight and the quantity of nitrogen-containing substance of the hydrophilic organic polymer of the exterior coating expressed as percent by weight, is at least 1 percent.

17. The printing medium of claim 1 wherein:

(a) the difference between the quantity of nitrogen-containing substance of the hydrophilic organic polymer of the second interior coating expressed as percent by weight and the quantity of nitrogen-containing substance of the hydrophilic organic polymer of the first interior coating expressed as percent by weight, is at least 5 percent, and (b) the difference between the quantity of nitrogen-containing substance of the hydrophilic organic polymer of the second interior coating expressed as percent by weight and the quantity of nitrogen-containing substance of the hydrophilic organic polymer of the exterior coating expressed as percent by weight, is at least 5 percent.

18. The printing medium of claim 1 wherein:

(a) the difference between the quantity of nitrogen-containing substance of the hydrophilic organic polymer of the second interior coating expressed as percent by weight and the quantity of nitrogen-containing substance of the hydrophilic organic polymer of the first interior coating expressed as percent by weight, is at least 10 percent, and (b) the difference between the quantity of nitrogen-containing substance of the hydrophilic organic polymer of the second interior coating expressed as percent by weight and the quantity of nitrogen-containing substance of the hydrophilic organic polymer of the exterior coating expressed as percent by weight, is at least 10 percent.

* * * * *